(12) United States Patent
Ikoma et al.

(10) Patent No.: US 9,023,921 B2
(45) Date of Patent: May 5, 2015

(54) METHOD FOR INHIBITING CRYSTAL GROWTH RATE OF AMIDE COMPOUND AND METHOD FOR PRODUCING MOLDED ARTICLE OF POLYOLEFIN-BASED RESIN

(75) Inventors: Reira Ikoma, Kyoto (JP); Shohei Iwasaki, Kyoto (JP); Yohei Uchiyama, Kyoto (JP)

(73) Assignee: New Japan Chemical Co., Ltd., Kyoto-shi (JP)

( * ) Notice: Subject to any disclaimer, the term of this patent is extended or adjusted under 35 U.S.C. 154(b) by 507 days.

(21) Appl. No.: 13/264,488

(22) PCT Filed: May 13, 2010

(86) PCT No.: PCT/JP2010/058098
§ 371 (c)(1),
(2), (4) Date: Oct. 14, 2011

(87) PCT Pub. No.: WO2010/131705
PCT Pub. Date: Nov. 18, 2010

(65) Prior Publication Data
US 2012/0035304 A1 Feb. 9, 2012

(30) Foreign Application Priority Data
May 13, 2009 (JP) ................................. 2009-116550

(51) Int. Cl.
| | |
|---|---|
| C08K 5/20 | (2006.01) |
| C07D 493/10 | (2006.01) |
| C07C 69/732 | (2006.01) |
| C07D 251/32 | (2006.01) |
| C08L 23/02 | (2006.01) |
| C08K 5/3492 | (2006.01) |
| C08K 5/13 | (2006.01) |
| C08L 23/10 | (2006.01) |
| C08L 23/12 | (2006.01) |
| C08L 53/00 | (2006.01) |
| C08K 5/134 | (2006.01) |
| C08K 5/1575 | (2006.01) |

(52) U.S. Cl.
CPC . *C08L 23/02* (2013.01); *C08K 5/13* (2013.01); *C08K 5/20* (2013.01); *C08L 23/10* (2013.01); *C08L 23/12* (2013.01); *C08L 53/00* (2013.01); *C08K 5/1345* (2013.01); *C08K 5/1575* (2013.01); *C08K 5/34924* (2013.01)

(58) Field of Classification Search
USPC ............ 524/210, 101, 229, 226, 108; 560/75; 544/192; 549/335
See application file for complete search history.

(56) References Cited

U.S. PATENT DOCUMENTS

| | | | |
|---|---|---|---|
| 6,235,823 B1 * | 5/2001 | Ikeda et al. | 524/229 |
| 2004/0249031 A1 | 12/2004 | Sadamitsu et al. | |
| 2006/0091581 A1 | 5/2006 | Sadamitsu et al. | |
| 2007/0269719 A1 * | 11/2007 | Sadamitsu et al. | 429/249 |
| 2010/0016491 A1 | 1/2010 | Niga et al. | |

FOREIGN PATENT DOCUMENTS

| | | |
|---|---|---|
| EP | 0 557 721 A2 | 9/1993 |
| EP | 1 757 653 A1 | 2/2007 |
| EP | 2 018 962 A1 | 1/2009 |
| JP | 6-192496 A | 7/1994 |
| JP | 7-188246 A | 7/1995 |
| JP | 7-242610 A | 9/1995 |
| JP | 7-278374 A | 10/1995 |
| JP | 8-100088 A | 4/1996 |
| JP | 8-134227 A | 5/1996 |
| JP | 08-197640 * | 8/1996 |
| JP | 8-197640 A | 8/1996 |
| JP | 2006-089727 A | 4/2006 |
| JP | 2008-120931 A | 5/2008 |
| JP | 2008-274126 A | 11/2008 |
| WO | 03/025047 A1 | 3/2003 |
| WO | 2008/075410 A1 | 6/2008 |

OTHER PUBLICATIONS

Irganox 1010; Ciba Specialty Chemicals Additives Polymer Additives, Aug. 1998; pp. 1-2.*
Supplementary European Search Report dated Oct. 15, 2012, issued in corresponding European Patent Application No. 10 77 4962 (7 page).
Yamaguchi, Masayuki et al., "Anomalous molecular orientation of isotactic polypropylene sheet containing N,N'-dicyclohexyl-2,6-naphthalenedicarboxamide", Polymer, Elsevier Science Publishers B.V, GB, vol. 50, No. 6, Mar. 6, 2009, pp. 1497-1504, XP025992742.
Xiao, Wenchang et al., "Influence of a Novel b-Nucleating Agent on the Structure, Morphology, and Nonisothermal Crystallization Behavior of Isotactic Polypropylene", Feb. 10, 2008, pp. 1076-1085, XP002684669.
International Search Report of PCT/JP2010/058098, mailing date Jul. 27, 2010.

\* cited by examiner

*Primary Examiner* — James J Seidleck
*Assistant Examiner* — Deve E Valdez
(74) *Attorney, Agent, or Firm* — Westerman, Hattori, Daniels & Adrian, LLP

(57) ABSTRACT

A method for inhibiting the crystal growth rate of an amide compound present in a molten polyolefin-based resin and a method for producing a polyolefin-based resin molded article are provided.
A phenol compound is incorporated into an amide compound-containing polyolefin-based resin such that a weight ratio, amide compound:phenol compound, is 60:40 to 10:90.

17 Claims, 2 Drawing Sheets

METHOD FOR INHIBITING CRYSTAL GROWTH RATE OF AMIDE COMPOUND AND METHOD FOR PRODUCING MOLDED ARTICLE OF POLYOLEFIN-BASED RESIN

TECHNICAL FIELD

The present invention relates to a method for inhibiting the crystal growth rate of an amide compound that is present in a molten polyolefin-based resin, a crystal growth rate inhibitor for an amide compound, use of a phenol compound as a crystal growth rate inhibitor for an amide compound, and a method for producing a polyolefin-based resin molded article.

BACKGROUND ART

Since polyolefin-based resins excel in moldability, mechanical properties, electrical properties and the like, they are used in various fields as materials for film forming (forming for film production), sheet forming (forming for sheet production), blow molding, injection molding, and the like. Although polyolefin-based resins generally have excellent physical properties, they are poor in transparency, crystallinity, and rigidity. In order to overcome these problems, technologies have been proposed in which amide compounds and the like are utilized as nucleating agents (Patent Literatures 1 to 5). When polyolefin-based resin compositions containing such amide compounds are molded, molded articles that excel in transparency and mechanical strength can be obtained.

In order to obtain polyolefin molded articles having such excellent properties through commercial production, it is necessary to optimize the molding conditions according to a desired molding method. As the molding methods, various methods are known such as injection molding, extrusion molding, sheet forming, film forming, and blow molding. In injection molding, for example, it is necessary to combine and set various factors such as injection speed, injection pressure, resin temperature (cylinder temperature, nozzle temperature, and the like), resin injection amount, screw rotation speed, mold temperature, mold shape, gate-seal time, and the like. The setting operation is complicated and thus requires effort and time. If such settings are inappropriate, the inappropriateness adversely affects the physical properties of molded articles, or causes white spots or fish eyes due to undissolved matter of a nucleating agent remaining, resulting in defects in the appearance of polyolefin molded articles.

CITATION LIST

Patent Literature

[PTL 1] Japanese Unexamined Patent Publication No. H06-192496
[PTL 2] Japanese Unexamined Patent Publication No. H07-188246
[PTL 3] Japanese Unexamined Patent Publication No. H07-242610
[PTL 4] Japanese Unexamined Patent Publication No. H07-278374
[PTL 5] Japanese Unexamined Patent Publication No. H08-100088

SUMMARY OF INVENTION

Technical Problem

An object of the present invention is to provide a method for inhibiting the crystal growth rate of an amide compound that is present in a molten polyolefin-based resin, a crystal growth rate inhibitor for an amide compound, use of a phenol compound as a crystal growth rate inhibitor for an amide compound, and a method for producing a polyolefin-based resin molded article.

Solution to Problem

The inventors of the present invention produced a molded article using a specific amide compound while optimizing the production conditions. During the production, the pressure of an extruder increased (such increase was mainly caused by clogging of a screen mesh or the like, and in this case, reduced productivity due to wasted operation time, loss in resin and the like that were caused by screen mesh replacement is posed as a problem), or white spots or fish eyes were developed in the molded article.

The inventors studied the cause, and presumed, on the basis of low solubility of the amide compound with respect to a polyolefin-based resin, that the amide compound remained as undissolved matter in the polyolefin-based resin since a preset temperature of the extruder did not reach the dissolution temperature or dissolution time was short. The inventors considered that it is possible to overcome the cause by micronizing the amide compound or by increasing a preset temperature of a kneading machine.

However, even after the specific amide compound was completely dissolved in the polyolefin-based resin, increase in the pressure of the extruder or development of white spots was observed. Accordingly, the inventors further studied the cause, and found the following matters.
(i) The problems were mainly caused by the fact that crystals of the specific amide compound present in the molten polyolefin-based resin grow.
(ii) The crystal growth rate of the specific amide compound (microcrystals) which was completely dissolved in the polyolefin-based resin and then cooled to be crystallized in the polyolefin-based resin was relatively high in the molten polyolefin-based resin.
(iii) The crystal growth rate of the amide compound was relatively high when a resin temperature was generally in the range of 180 to 260° C., although the crystal growth rate depends on the type or content of the amide compound.
(iv) In addition, the amide compound has a nucleating effect on the polyolefin-based resin. However, due to the crystal growth, the surface area of the amid compound was reduced, and thus the nucleating effect tended to be reduced.

The inventors of the present invention thought that a technique to inhibit the crystal growth of the specific amide compound was needed in addition to the optimization of the molding conditions, and as a result of thorough research, the inventors found that when a phenol compound coexisted in the polyolefin-based resin in a range of a specific amount with respect to the specific amide compound, the crystal growth rate of the amide compound present in the molten polyolefin-based resin was able to be remarkably inhibited.

The inventors of the present invention considered, as follows, the phenomenon that crystals of an amide compound present in a polyolefin-based resin in a molten state grow.

A state where the amide compound is present in the polyolefin-based resin in a molten state is a state where it is in a temperature range lower than the temperature at which the amide compound is completely dissolved in the molten polyolefin-based resin. Thus, the amide compound present as crystals and the amide compound dissolved in the molten polyolefin-based resin are present. In general, it is thought that in this state, dissolution and precipitation of crystals are held in equilibrium.

However, it was thought that the polyolefin-based resin having a relatively low polarity and the amide compound having a relatively high polarity have poor compatibility with each other. Thus, it was thought that the crystals of the amide compound are likely to aggregate rather than be dissolved in the polyolefin-based resin, and consequently the crystals of the amide compound grow.

The inventors of the present invention thought that the inhibiting effect of the present invention is caused by the interaction between the specific amide compound and the phenol compound, in other words, it is related to decrease in the solubility of the amide compound to the molten polyolefin resin, inhibition of aggregation of the crystals, and the like. The interaction also influences the dissolution temperature of the amide compound. This influence is that it is recognized that with regard to the blending ratio of the amide compound and the phenol compound, when the rate of the phenol compound is high, the dissolution temperature tends to increase (below-described examples).

The present invention has been completed on the basis of the above findings. In other words, the present invention provides inventions of the following items.

(Item 1) A method for producing a polyolefin-based resin molded article, comprising a step of molding a molten polyolefin-based resin composition in which crystals of an amide compound represented by the following general formula (1) are present in a polyolefin-based resin in a molten state, wherein the molten polyolefin-based resin composition contains a phenol compound, and a blending ratio of the amide compound and the phenol compound is 60:40 to 10:90 (weight ratio), general formula (1):

$$R^1—(CONHR^2)_n \qquad (1),$$

wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms.

(Item 2) The method for producing a polyolefin-based resin molded article according to Item 1, comprising the steps of:

(i) heating and dissolving the amide compound in the polyolefin-based resin;

(ii) cooling the polyolefin-based resin composition in a molten state obtained in the step (i), to precipitate crystals of the amide compound; and (iii) melting the polyolefin-based resin composition which the crystals of the amide compound are precipitated, obtained in the step (ii), in a temperature range of $T_1+10°$ C. to $T_2-10°$ C. ($T_1$ represents a melting point of the polyolefin-based resin and $T_2$ represents a dissolution temperature of the amide compound), and molding the molten polyolefin-based resin composition, wherein in at least one member selected from the steps (i) to (iii), the phenol compound is blended in the range of the blending ratio.

(Item 3) The method for producing a polyolefin-based resin molded article according to Item 1 or 2, wherein $R^1$ described in general formula (1) is formula (a):

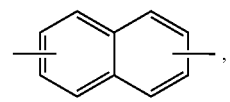

(a)

or formula (b):

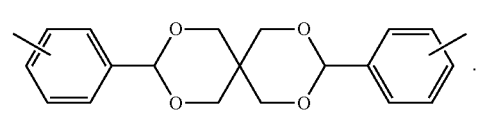

(b)

(Item 4) The method for producing a polyolefin-based resin molded article according to any one of Items 1 to 3, wherein the phenol compound is general formula (2a):

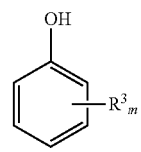

(2a)

wherein m represents an integer of 2 to 5, and m $R^3$s are the same or different and each represent a linear or branched alkyl group having 1 to 25 carbon atoms that may have an ester bond, a thioether bond, or an ether bond, general formula (2b):

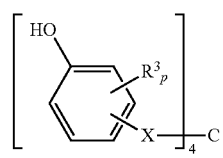

(2b)

wherein p represents an integer of 1 to 4, p R's are the same as those in the formula (2a), and X represents a linear or branched alkylene group having 1 to 10 carbon atoms that may have an ester bond or an ether bond, or general formula (2c):

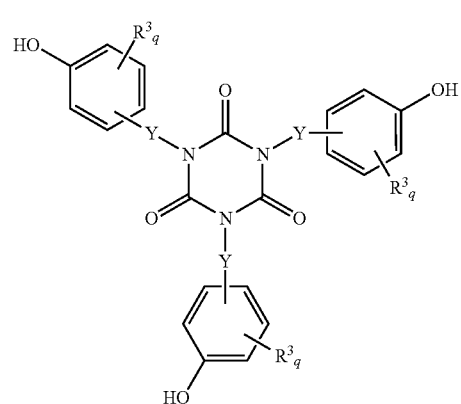

(2c)

wherein q represents an integer of 1 to 4, q $R^3$s are the same as those in the formula (2a), and Y represents a linear or branched alkylene group having 1 to 10 carbon atoms.

(Item 5) The method for producing a polyolefin-based resin molded article according to any one of Items 1 to 4, wherein the melting temperature of the molten polyolefin-based resin composition described in Item 1 or a melting temperature in the step (iii) described in Item 2 is 180 to 260° C.

(Item 6) The method for producing a polyolefin-based resin molded article according to any one of Items 1 to 5, wherein a blending amount of the phenol compound is 0.07 to 1 parts by weight per 100 parts by weight of the polyolefin-based resin.

(Item 7) The method for producing a polyolefin-based resin molded article according to any one of Items 1 to 6, wherein a blending amount of the amide compound is 0.07 to 1 parts by weight per 100 parts by weight of the polyolefin-based resin.

(Item 8) The method for producing a polyolefin-based resin molded article according to any one of Items 1 to 7, wherein the polyolefin-based resin is a polypropylene-based resin, the amide compound is a β-form crystallization nucleating agent for polypropylene, and the polyolefin-based resin molded article is a polypropylene-based resin molded article having a β-form crystal content of 50% or higher.

(Item 9) A method for inhibiting a crystal growth rate of an amide compound represented by the following general formula (1) that is present in a molten polyolefin-based resin, the method comprising incorporating a phenol compound into a polyolefin-based resin such that a ratio of the amide compound and the phenol compound is 60:40 to 10:90 (weight ratio), general formula (1):

$R^1$—(CONHR$^2$)$_n$   (1), wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms.

(Item 10) The method according to Item 9, wherein a melting temperature of the molten polyolefin-based resin composition is in a temperature range of $T_1+10°$ C. to $T_2-10°$ C. ($T_1$ represents a melting point of the polyolefin-based resin and $T_2$ represents a dissolution temperature of the amide compound).

(Item 11) The method according to Item 9, wherein the phenol compound is blended in at least one member selected from the following steps (i) to (iii):

(i) heating and dissolving the amide compound in the polyolefin-based resin;

(ii) cooling the polyolefin-based resin composition in a molten state, obtained in the step (i), to precipitate crystals of the amide compound; and (iii) melting the polyolefin-based resin composition in which the crystals of the amide compound are precipitated, obtained in the step (ii), in a temperature range of $T_1+10°$ C. to $T_2-10°$ C. ($T_1$ represents a melting point of the polyolefin-based resin and $T_2$ represents a dissolution temperature of the amide compound), and molding the molten polyolefin-based resin composition, and inhibiting the crystal growth rate of the amide compound present in the molten polyolefin-based resin in the step (iii), and with regard to the blending ratio of the phenol compound, amide compound:phenol compound is 60:40 to 10:90 (weight ratio).

(Item 12) The method according to any one of Items 9 to 11, wherein $R^1$ described in general formula (1) is formula (a):

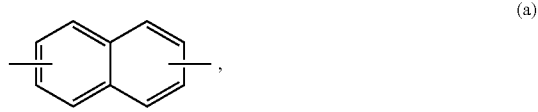

or formula (b):

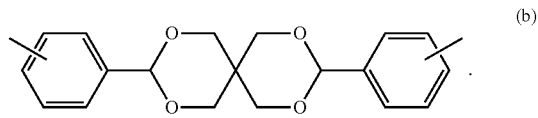

(Item 13) The method according to any one of Items 9 to 12, wherein the phenol compound is general formula (2a):

wherein m represents an integer of 2 to 5, and m $R^3$s are the same or different and each represent a linear or branched alkyl group having 1 to 25 carbon atoms that may have an ester bond, a thioether bond, or an ether bond, general formula (2b):

wherein p represents an integer of 1 to 4, p $R^3$s are the same as those in the formula (2a), and X represents a linear or branched alkylene group having 1 to 10 carbon atoms that may have an ester bond or an ether bond, or general formula (2c):

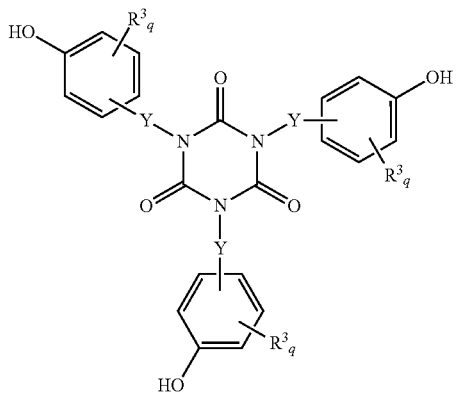

(2c)

wherein q represents an integer of 1 to 4, q $R^3$s are the same as those in the formula (2a), and Y represents a linear or branched alkylene group having 1 to 10 carbon atoms.

(Item 14) The method according to any one of Items 9 to 13, wherein the melting temperature of the molten polyolefin-based resin described in Item 9 or a melting temperature in the step (iii) described in item 11 is 180 to 260° C.

(Item 15) The method according to any one of Items 9 to 14, wherein a blending amount of the phenol compound is 0.07 to 1 parts by weight per 100 parts by weight of the polyolefin-based resin.

(Item 16) The method according to any one of Items 9 to 15, wherein a blending amount of the amide compound is 0.07 to 1 parts by weight per 100 parts by weight of the polyolefin-based resin.

(Item 17) A crystal growth rate inhibitor for crystals of an amide compound represented by the following general formula (1) that are present in a molten polyolefin-based resin, the crystal growth rate inhibitor comprising a phenol compound as an active ingredient, general formula (1):

wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms.

(Item 18) Use of a phenol compound as a crystal growth rate inhibitor for crystals of an amide compound represented by the following general formula (1) that are present in a molten polyolefin-based resin at $T_1+10°$ C. to $T_2-10°$ C. ($T_1$ represents a melting point of the polyolefin-based resin and $T_2$ represents a dissolution temperature of the amide compound), general formula (1):

wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms.

Advantageous Effects of Invention

According to the present invention, the crystal growth rate of an amide compound that is present in a molten polyolefin-based resin can be inhibited. Then, the present invention can contribute to improvement of productivity by suppressing increase in the pressure of a molding machine or the like that is caused by growth of crystals of the amide compound (by reducing clogging of a screen mesh or the like), and can contribute to improvement of the appearance of a molded article by reducing white spots that are based on the amide compound in the polyolefin molded article.

DESCRIPTION OF EMBODIMENTS

<Method for Producing Polyolefin-Based Resin Molded Article>

A producing method of the present invention is a method for producing a polyolefin-based resin molded article, comprising a step of molding a molten polyolefin-based resin composition in which crystals of an amide compound represented by the above general formula (1) are present in a polyolefin-based resin in a molten state. The molten polyolefin-based resin composition contains a phenol compound, and a blending ratio of the amide compound and the phenol compound is 60:40 to 10:90 (weight ratio). More preferably, in light of more remarkably or more stably exerting the effect of the present invention, a mode is recommended in which the phenol compound is 0.07 to 1 parts by weight per 100 parts by weight of the polyolefin-based resin and/or the amide compound is 0.07 to 1 parts by weight per 100 parts by weight of the polyolefin-based resin.

Further, performing molding in a state where crystals of the amide compound are present in the molding step contributes to improvement of physical properties such as improvement of the rigidity of the molded article. In addition, the molecular chain of polyolefin tends to exhibit orientation due to this molding method, and thus the molded article tends to exhibit orientation.

Polyolefin-Based Resin

Examples of the polyolefin resin according to the present invention include polyethylene-based resins, polypropylene-based resins, polymethylpentene-based resins, and polybutene-based resins, and these resins can be used singly or as mixtures of two or more types as appropriate.

Specifically, examples of polyethylene-based resins include high density polyethylene, medium density polyethylene, linear polyethylene, and ethylene copolymers having ethylene contents of 50 wt % or more (preferably 70 wt % or more, and particularly 85 wt % or more); examples of polypropylene-based resins include propylene homopolymers and propylene copolymers having propylene contents of 50 wt % or more (preferably 70 wt % or more, and particularly 85 wt % or more); examples of polybutene-based resins include butene homopolymers and butene copolymers having butene contents of 50 wt % or more (preferably 70 wt % or more, and particularly 85 wt % or more); and examples of polymethylpentene-based resins include methylpentene homopolymers, methylpentene copolymers having methylpentene contents of 50 wt % or more (preferably 70 wt % or more, and particularly 85 wt % or more), and polybutadiene.

The above-mentioned copolymers may be random copolymers or block copolymers. When these resins have stereoregularity, these resins may be isotactic or syndiotactic.

Specific examples of comonomers that can form the above-mentioned copolymers include α-olefins having 2 to 12 carbon atoms such as ethylene, propylene, butene, pentene, hexene, heptene, octene, nonene, decene, undecene, and dodecene, bicyclo-type monomers such as 1,4-endomethylenecyclohexene, (meth)acrylic acid esters such as methyl (meth)acrylate and ethyl (meth)acrylate, and vinyl acetate.

Among the above-mentioned polyolefin resins, in view of effects of the present invention, polyethylene-based resins and polypropylene-based resins are preferred, and polypropylene-based resins are particularly recommended.

Examples of catalysts used for producing such polymers include not only generally used Ziegler-Natta catalysts, but also catalyst systems comprising a combination of a catalyst in which a transition metal compound (e.g., a titanium halide such as titanium trichloride, titanium tetrachloride or the like) supported on a support comprising, as a principal component, a magnesium halide such as magnesium chloride, with an alkylaluminum compound (tetraethylaluminum, diethylaluminum chloride or the like), and metallocene catalysts.

The melt flow rate (measured according to JIS K 7210-1995) of the polyolefin-based resin according to the present invention is suitably selected according to the molding method to be used, and the recommended melt flow rate is normally 0.01 to 200 g/10 minutes and preferably 0.05 to 100 g/10 minutes.

Amide Compound

The amide compound according to the present invention is at least one amide compound represented by the above general formula (1). The amide compound can be produced according to a known method, or commercial products can also be used. In general, the amide compound is used as a nucleating agent for a polyolefin-based resin.

In the above general formula (1), n is 2 to 4, and an integer of 2 or 3 is preferably recommended. $R^1$ is a saturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, a saturated aliphatic polycarboxylic acid residue having 3 to 5 carbon atoms, an alicyclic polycarboxylic acid residue having 5 to 10 carbon atoms, and an aromatic polycarboxylic acid residue having 6 to 22 carbon atoms are preferably recommended, and a saturated aliphatic polycarboxylic acid residue having 3 or 4 carbon atoms and an aromatic polycarboxylic acid residue having 10 to 20 carbon atoms are particularly recommended. n $R^2$s are the same or different and each are a saturated aliphatic amine residue having 5 to 22 carbon atoms, a saturated alicyclic amine residue having 5 to 20 carbon atoms, or an aromatic amine residue having 6 to 20 carbon atoms, a saturated aliphatic amine residue having 6 to 10 carbon atoms, a saturated alicyclic amine residue having 5 to 14 carbon atoms, or an aromatic amine residue having 6 to 14 carbon atoms is preferably recommended, and a saturated alicyclic amine residue having 5 to 12 carbon atoms is particularly recommended.

The "polycarboxylic acid residue" refers to the groups remaining as a result of removing all the carboxyl groups from polycarboxylic acid, and the number of the carbon atoms indicates the total number of the carbon atoms in the polycarboxylic acid residue. Further, the "amine residue" refers to the groups remaining as a result of removing the amino groups from a monoamine, and the number of the carbon atoms indicates the total number of the carbon atoms in the amine residue.

Specific examples of the amide compound include N,N'-dicyclohexyl-1,4-cyclohexanedicarboxamide, N,N'-dicyclohexyl-terephthalamide, N,N'-dicyclohexyl-4,4'-biphenyldicarboxamide, N,N'-dicyclopentyl-4,4'-biphenyldicarboxamide, N,N'-dicyclooctyl-4,4'-biphenyldicarboxamide, N,N'-dicyclododecyl-4,4'-biphenyldicarboxamide, N,N'-dicyclohexyl-2,2'-biphenyldicarboxamide, N,N'-diphenylhexanediamide, N,N'-bis(p-methylphenyl)hexanediamide, N,N'-bis(p-ethylphenyl)hexanediamide, N,N'-bis(4-cyclohexylphenyl)hexanediamide, 1,2,3-propanetricarboxylic acid tricyclohexylamide, 1,2,3-propanetricarboxylic acid tri(2-methylcyclohexylamide), 1,2,3-propanetricarboxylic acid tri(3-methylcyclohexylamide), 1,2,3-propanetricarboxylic acid tri(4-methylcyclohexylamide), 1,2,3,4-butanetetracarboxylic acid tetracyclohexylamide, 1,2,3,4-butanetetracarboxylic acid tetra(2-methylcyclohexylamide), 1,2,3,4-butanetetracarboxylic acid tetra(3-methylcyclohexylamide), 1,2,3,4-butanetetracarboxylic acid tetra(4-methylcyclohexylamide), adipic acid dianilide, suberic acid dianilide, trimesic acid tricyclohexylamide, trimesic acid tri-tert-butylamide, trimesic acid tri(2-methylcyclohexylamide), trimesic acid tri(4-methylcyclohexylamide), trimesic acid tri(2-ethylcyclohexylamide), trimesic acid tri(4-ethylcyclohexylamide), trimesic acid tri(4-n-propylcyclohexylamide), trimesic acid tri(4-isopropylcyclohexylamide), trimesic acid tri(4-n-butylcyclohexylamide), trimesic acid tri(4-isobutylcyclohexylamide), trimesic acid tri(4-tert-butylcyclohexylamide), trimesic acid tri(4-sec-butylcyclohexylamide), trimesic acid tri(2,3-dimethylcyclohexylamide), trimesic acid tri(2,4-dimethylcyclohexylamide), N,N'-di(p-t-butylphenyl)-2,6-naphthalenedicarboxamide, N,N'-dicyclohexyl-2,6-naphthalenedicarboxamide, N,N'-di(2-methylcyclohexyl)-2,6-naphthalenedicarboxamide, N,N'-di(2,3-dimethylcyclohexyl)-2,6-naphthalenedicarboxamide, N,N'-di(t-butylcyclohexyl)-2,6-naphthalenedicarboxamide, N,N'-dicyclopentyl-2,6-naphthalenedicarboxamide, N,N'-dicyclooctyl-2,6-naphthalenedicarboxamide, N,N'-dicyclododecyl-2,6-naphthalenedicarboxamide, N,N'-dicyclohexyl-2,7-naphthalenedicarboxamide, 3,9-bis[4-(N-cyclohexylcarbamoyl)phenyl]-2,4,8,10-tetraoxaspiro[5.5]undecane, 3,9-bis{4-[N-(4-tert-butylcyclohexyl)carbamoyl]phenyl}-2,4,8,10-tetraoxaspiro[5.5]undecane, 3,9-bis{4-[N-(2,4-di-tert-butylcyclohexyl)carbamoyl]phenyl}-2,4,8,10-tetraoxaspiro[5.5]undecane, 3,9-bis{4-[N-(1-adamantyl)carbamoyl]phenyl}-2,4,8,10-tetraoxaspiro[5.5]undecane, 3,9-bis[4-(N-phenylcarbamoyl)phenyl]-2,4,8,10-tetraoxaspiro[5.5]undecane, 3,9-bis{4-[N-(4-tert-butylphenyl)carbamoyl]phenyl}-2,4,8,10-tetraoxaspiro[5.5]undecane, 3,9-bis{4-[N-(2,4-di-tert-butylphenyl)carbamoyl]phenyl}-2,4,8,10-tetraoxaspiro[5.5]undecane, 3,9-bis{4-[N-(1-naphthyl)carbamoyl]phenyl}-2,4,8,10-tetraoxaspiro[5.5]undecane, 3,9-bis[4-(N-n-butylcarbamoyl)phenyl]-2,4,8,10-tetraoxaspiro[5.5]undecane, 3,9-bis[4-(N-n-hexylcarbamoyl)phenyl]-2,4,8,10-tetraoxaspiro[5.5]undecane, 3,9-bis[4-(N-n-dodecylcarbamoyl)phenyl]-2,4,8,10-tetraoxaspiro[5.5]undecane, 3,9-bis[4-(N-n-octadecylcarbamoyl)phenyl]-2,4,8,10-tetraoxaspiro[5.5]undecane, 3,9-bis(4-carbamoylphenyl)-2,4,8,10-tetraoxaspiro[5.5]undecane, 3,9-bis[4-(N,N-dicyclohexylcarbamoyl)phenyl]-2,4,8,10-tetraoxaspiro[5.5]undecane, 3,9-bis[4-(N,N-diphenylcarbamoyl)phenyl]-2,4,8,10-tetraoxaspiro[5.5]undecane, 3,9-bis[4-(N-n-butyl-N-cyclohexylcarbamoyl)phenyl]-2,4,8,10-tetraoxaspiro[5.5]undecane, 3,9-bis[4-(N-n-butyl-N-phenylcarbamoyl)

phenyl]-2,4,8,10-tetraoxaspiro[5.5]undecane, 3,9-bis[4-(1-pyrrolidinylcarbonyl)phenyl]-2,4,8,10-tetraoxaspiro[5.5]undecane, and 3,9-bis[4-(1-piperidinylcarbonyl)phenyl]-2,4,8,10-tetraoxaspiro[5.5]undecane.

Preferably, general formula (1) wherein $R^1$ has the above formula (a):

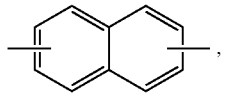
(a)

or the above formula (b):

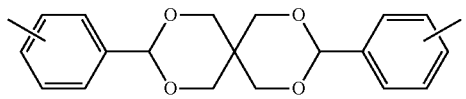
(b)

is recommended.

Specific examples of the above formula (a) include N,N'-di(p-t-butylphenyl)-2,6-naphthalenedicarboxamide, N,N'-dicyclohexyl-2,6-naphthalenedicarboxamide, N,N'-di(2-methylcyclohexyl)-2,6-naphthalenedicarboxamide, N,N'-di(2,3-dimethylcyclohexyl)-2,6-naphthalenedicarboxamide, N,N'-di(t-butylcyclohexyl)-2,6-naphthalenedicarboxamide, N,N'-dicyclopentyl-2,6-naphthalenedicarboxamide, N,N'-dicyclooctyl-2,6-naphthalenedicarboxamide, N,N'-dicyclododecyl-2,6-naphthalenedicarboxamide, and N,N'-dicyclohexyl-2,7-naphthalenedicarboxamide. More preferably, N,N'-dicyclohexyl-2,6-naphthalenedicarboxamide, N,N'-di(2-methylcyclohexyl)-2,6-naphthalenedicarboxamide, N,N'-di(2,3-dimethylcyclohexyl)-2,6-naphthalenedicarboxamide, and N,N'-di(t-butylcyclohexyl)-2,6-naphthalenedicarboxamide are recommended.

Further, specific examples of the above formula (b) include 3,9-bis[4-(N-cyclohexylcarbamoyl)phenyl]-2,4,8,10-tetraoxaspiro[5.5]undecane, 3,9-bis{4-[N-(4-tert-butylcyclohexyl)carbamoyl]phenyl}-2,4,8,10-tetraoxaspiro[5.5]undecane, 3,9-bis{4-[N-(2,3-dimethylcyclohexyl)carbamoyl]phenyl}-2,4,8,10-tetraoxaspiro[5.5]undecane, 3,9-bis{4-[N-(2,4-di-tert-butylcyclohexyl)carbamoyl]phenyl}-2,4,8,10-tetraoxaspiro[5.5]undecane, 3,9-bis{4-[N-(1-adamantyl)carbamoyl]phenyl}-2,4,8,10-tetraoxaspiro[5.5]undecane, 3,9-bis[4-(N-phenylcarbamoyl)phenyl]-2,4,8,10-tetraoxaspiro[5.5]undecane, 3,9-bis{4-[N-(4-tert-butylphenyl)carbamoyl]phenyl}-2,4,8,10-tetraoxaspiro[5.5]undecane, 3,9-bis{4-[N-(2,4-di-tert-butylphenyl)carbamoyl]phenyl]-2,4,8,10-tetraoxaspiro[5.5]undecane, 3,9-bis{4-[N-(1-naphthyl)carbamoyl]phenyl}-2,4,8,10-tetraoxaspiro[5.5]undecane, 3,9-bis[4-(N-n-butylcarbamoyl)phenyl]-2,4,8,10-tetraoxaspiro[5.5]undecane, 3,9-bis[4-(N-n-hexylcarbamoyl)phenyl]-2,4,8,10-tetraoxaspiro[5.5]undecane, 3,9-bis[4-(N-n-dodecylcarbamoyl)phenyl]-2,4,8,10-tetraoxaspiro[5.5]undecane, 3,9-bis[4-(N-n-octadecylcarbamoyl)phenyl]-2,4,8,10-tetraoxaspiro[5.5]undecane, 3,9-bis(4-carbamoylphenyl)-2,4,8,10-tetraoxaspiro[5.5]undecane, 3,9-bis[4-(N,N-dicyclohexylcarbamoyl)phenyl]-2,4,8,10-tetraoxaspiro[5.5]undecane, 3,9-bis[4-(N,N-diphenylcarbamoyl)phenyl]-2,4,8,10-tetraoxaspiro[5.5]undecane, 3,9-bis[4-(N-n-butyl-N-cyclohexylcarbamoyl)phenyl]-2,4,8,10-tetraoxaspiro[5.5]undecane, 3,9-bis[4-(N-n-butyl-N-phenylcarbamoyl)phenyl]-2,4,8,10-tetraoxaspiro[5.5]undecane, 3,9-bis[4-(1-pyrrolidinylcarbonyl)phenyl]-2,4,8,10-tetraoxaspiro[5.5]undecane, and 3,9-bis[4-(1-piperidinylcarbonyl)phenyl]-2,4,8,10-tetraoxaspiro[5.5]undecane. More preferably, 3,9-bis[4-(N-cyclohexylcarbamoyl)phenyl]-2,4,8,10-tetraoxaspiro[5.5]undecane, 3,9-bis{4-[N-(4-tert-butylcyclohexyl)carbamoyl]phenyl}-2,4,8,10-tetraoxaspiro[5.5]undecane, 3,9-bis{4-[N-(2,4-di-tert-butylcyclohexyl)carbamoyl]phenyl}-2,4,8,10-tetraoxaspiro[5.5]undecane, and 3,9-bis{4-[N-(2,3-dimethylcyclohexyl)carbamoyl]phenyl}-2,4,8,10-tetraoxaspiro[5.5]undecane are recommended.

When the polyolefin-based resin is a polypropylene-based resin, a β-form crystallization nucleating agent that can cause the crystal form of the polypropylene-based resin to be β-form crystal when the polypropylene-based resin is molded is recommended among the amide compounds represented by the above general formula (1). In this case, the effect of the present invention is remarkably exerted. As the β-form crystallization nucleating agent, one that allows a polypropylene-based resin molded article having a β-form crystal content of preferably 50% or higher and more preferably 60% or higher to be formed is preferred.

Specifically, preferable examples of the above general formula (1) include general formula (1) wherein $R^1$ has formula (a) and formula (b). More preferably, the case where $R^2$ is a saturated alicyclic amine residue having 5 to 20 carbon atoms is recommended. More specific examples thereof include those described as the above-mentioned specific examples of formula (a) and the above-mentioned specific examples of formula (b).

For the β-form crystal content according to the present invention, an appropriate amount of a sample for evaluation is taken from the polypropylene-based resin molded article, and differential scanning calorimetry (DSC) is conducted under a nitrogen atmosphere at a temperature increase rate of 20° C./min. From the amounts of heat of fusion of α-form crystals and β-form crystals that are obtained from the DSC thermogram, the β-form crystal content is calculated according to the following equation.

$$\beta\text{-form crystal content } (\%) = 100 \times H_\beta / (H_\beta + H_\alpha)$$

[wherein, $H_\beta$ represents the amount of heat of fusion of β-form crystals (unit: J/g), and $H_\alpha$ represents the amount of heat of fusion of α-form crystals (unit: J/g).]

As a procedure for obtaining a polypropylene resin molded article having this β-form crystal content, procedures known in this field can be used (e.g., Japanese Unexamined Patent Publication No. 2001-342272, WO2002/66233, and the like). Specifically, when cooling is performed in a state where a β-form crystallization nucleating agent is dissolved or dispersed in a molten polypropylene-based resin to crystallize polypropylene, the cooling temperature, the cooling time and the like can be adjusted as appropriate to obtain a molded article having a β-form crystal content of 50% or higher.

The crystal system of the amide compound according to the present invention is not particularly limited as long as the effect of the present invention is obtained, and any crystal systems such as hexagonal system, monoclinic system, and cubic system can be used. These crystals are also known or can also be produced according to known methods. For example, these crystals can be obtained by conducting an amidation reaction using polycarboxylic acid and a monoamine as raw materials according to the description of Japanese Unexamined Patent Publication No. H07-242610 or Japanese Unexamined Patent Publication No. H07-188245. In addition, these crystals can also be obtained by amidating reactive derivatives such as acid anhydrides and chlorides of these polycarboxylic acids, and ester compounds of these polycarboxylic acids and lower alcohol having 1 to 4 carbon atoms. An amide compound produced according to a known method may contain a small amount of impurity, but its recommended purity is preferably equal to or more than 90 wt %, more preferably equal to or more than 95 wt %, and particularly preferably equal to or more than 97 wt %. Examples of the impurity include partially amidated products derived from reaction intermediates or unreacted materials, and imide compounds derived from side reaction products.

The particle size of the amide compound blended in the present invention is not particularly limited as long as the effect of the present invention is obtained. However, in light of dissolving time and dispersibility to the molten polyolefin-based resin, the particle size is preferably as small as possible, and the maximum particle size measured by laser diffraction light scattering measurement is normally equal to or less than 200 μm, preferably equal to or less than 100 μm, more preferably equal to or less than 50 μm, and particularly preferably equal to or less than 10 μm. Examples of the method for adjusting the maximum particle size within the above range include a method in which a usual apparatus known in this field is used to perform fine grinding and classify these fine particles. Specific examples thereof include a method in which fluidized bed type counter jet mil 100AFG (apparatus name, manufactured by Hosokawa Micron Corporation), supersonic jet mil PJM-200 (apparatus name, manufactured by Nippon Pneumatic MFG. Co., Ltd.), or the like is used to perform fine grinding and classification.

The recommended content of the amide compound is preferably 0.07 to 1 parts by weight, more preferably 0.1 to 0.7 parts by weight, and particularly 0.1 to 0.5 parts by weight, per 100 parts by weight of the polyolefin-based resin. In this range, a significant difference is recognized in the effect of the invention. When the amide compound is less than 0.07 parts by weight, the modifying effect as the nucleating agent may not sufficiently be exerted. In addition, when the amide compound exceeds 1 parts by weight, it is difficult to obtain the modifying effect corresponding to the amount of addition, and further the dissolution to the polyolefin-based resin is difficult and the tendency that the appearance is worsened by white spots, fish eyes and the like is recognized.

Phenol Compound

The phenol compound according to the present invention is preferably those of the above formulae (2a), (2b), and (2c). The phenol compound can be produced according to a known method, or commercial products can also be used.

In the above formula (2a), m is an integer of 2 to 5, preferably an integer of 2 to 4, and more preferably 3. Each $R^3$ is a linear or branched alkyl group having 1 to 25 carbon atoms that may have an ester bond, a thioether bond, or an ether bond. In addition, when each $R^3$ does not have a linking group of an ester bond, a thioether bond, or an ether bond, each $R^3$ is preferably a linear or branched alkyl group having preferably 1 to 6 carbon atoms and more preferably 1 to 4 carbon atoms. When each $R^3$ has the linking group, each $R^3$ is preferably a linear or branched alkyl group having preferably 5 to 25 carbon atoms and more preferably 8 to 22 carbon atoms. In addition, m $R^3$s may be the same or different. Further, each $R^3$ is preferably located at ortho position or para position with respect to a hydroxyl group, and it is particularly recommended that at least one $R^3$ is located at ortho position.

Specific examples thereof include formula (2a'):

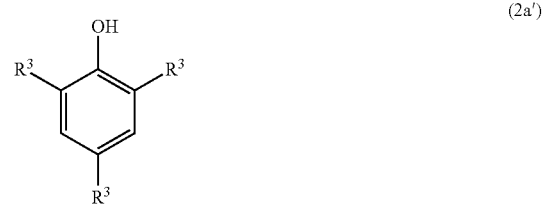

[wherein, $R^3$s are the same as those in the above formula (2a).], and more specific examples thereof include 2,6-di-tert-butyl-4-methylphenol, 2,6-di-tert-butyl-4-ethylphenol, n-octadecyl-β-(4'-hydroxy-3',5'-di-tert-butylphenyl)propionate, and 2,4-bis(octylthiomethyl)-6-methylphenol.

In the above formula (2b), p is an integer of 1 to 4, preferably an integer of 2 to 4, and more preferably 2. X represents a linear or branched alkylene group having 1 to 10 carbon atoms and preferably 1 to 6 carbon atoms that may have an ester bond or an ether bond.

Specific examples of the above formula (2b) include tetrakis[methylene-3-(3',5'-di-tert-butyl-4'-hydroxyphenyl) propionate]methane.

In the above formula (2c), q is an integer of 1 to 4, preferably an integer of 2 to 4, and more preferably 2. Y represents a linear or branched alkylene group having 1 to 10 carbon atoms and preferably 1 to 4 carbon atoms.

Specific examples of the above formula (2c) include 1,3, 5-tris(3',5'-di-tert-butyl-4'-hydroxybenzyl)-s-triazine-2,4,6 (1H,3H,5H)-trione and 1,3,5-tris(4-tert-butyl-3-hydroxy-2, 6-dimethylbenzyl)-1,3,5-triazine-2,4,6-(1H,3H,5H)-trione.

Other examples of phenol compounds include 2,6-bis(1, dimethylethyl)-4-methylphenol, tocopherol, 2,2'-methylenebis(4-methyl-6-tert-butylphenol), 2,2'-methylenebis(4-ethyl-6-tert-butylphenol), 4,4'-butylidenebis(6-tert-butyl-m-cresol), 1,1-bis(2'-methyl-4'-hydroxy-5'-tert-butylphenyl) butane, 4,4'-thiobis(6-tert-butyl-m-cresol), 4,4'-thiobis(3-methyl-6-tert-butylphenol), 3,5-di-tert-butyl-4-hydroxybenzylphosphonic acid mono-ethyl ester calcium salt, 2,2'-oxamidebis[ethyl-3-(3,5-di-tert-butyl-4-hydroxyphenyl)propionate], 2,2'-ethylidenebis(4,6-di-tert-butylphenol), 1,1,3-tris(2-methyl-4-hydroxy-5-tert-butylphenyl)butane, 2-tert-butyl-6-(3-tert-butyl-2-hydroxy-5-methylbenzyl)-4-methylphenylacrylate, 1,3,5-trimethyl-2,4, 6-tris(3,5-di-tert-butyl-4-hydroxybenzyl)benzene, bis[3,3-bis(4'-hydroxy-3'-tert-butylphenyl)butanoic acid]glycol ester, 1,4-benzenedicarboxylic acid bis[2-(1,1-dimethylethyl)-6-[[3-(1,1-dimethylethyl)-2-hydroxy-5-methylphenyl]methyl]-4-methylphenyl]ester, N,N,-bis{(3-(3,5-di-tert-butyl-4-hydroxyphenyl)propionyl)}hydrazine, 3,9-bis[2-{3-(3-tert-butyl-4-hydroxy-5-methylphenyl)propionyloxy]-1,1-dimethylethyl}-2,4,8,10-tetraoxaspiro[5,5]undecane, 2,6-di-tert-butyl-4-{4,6-bis(octylthio)-1,3,5-triazin-2-yl-amino}phenol, 2-[4,6-di(2,4-xylyl)-1,3,5-triazin-2-yl]-5-octyloxyphenol, triethylene glycol-bis[(3-(3-tert-butyl-4-hydroxy-5-methylphenyl)propionate], 1,3,5-tris(3,5-di-tert-butyl-4-hydroxybenzyl)isocyanurate, and 2-[1-(2-hydroxy-3,5-di-tert-pentylphenyl)ethyl]-4,6-di-tert-pentylphenylacrylate.

These phenol compounds can be used singly or in combination as appropriate.

With regard to the used amount of the phenol compound with respect to the amide compound, the blending ratio, amide compound:phenol compound, is 60:40 to 10:90 (weight ratio) and preferably 60:40 to 20:80 (weight ratio). When the phenol compound is less than 60:40, the effect of the present invention is not sufficiently exerted. In addition, when the phenol compound is more than 10:90, it is difficult to obtain the effect corresponding to this used amount, and this is not economically preferable.

Further, in addition to the above blending ratio, light of more stably exerting the effect of inhibiting the crystal growth rate of the amide compound by the phenol compound, the phenol compound is preferably recommended to be in the range of 0.07 to 1 parts by weight, and more preferably recommended to be in the range of 0.08 to 0.8 parts by weight, per 100 parts by weight of the polyolefin-based resin. When the phenol compound is less than 0.07 parts by weight, the effect of the present invention may not stably and sufficiently be exerted. In addition, when the phenol compound is used in an amount exceeding 1 parts by weight, the tendency that a resin molded article is colored in yellow or yellowish green is recognized, and this is not preferable.

In the method for inhibiting the crystal growth rate of the amide compound of the present invention, a method for incorporating the phenol compound into the polyolefin-based resin is not particularly limited as long as the phenol compound can be incorporated into the polyolefin-based resin in a blending ratio, amide compound:phenol compound, of 60:40 to 10:90 (weight ratio) when or prior to molding the polyolefin resin composition containing the amide compound, and a known method can be used.

The method for producing a polyolefin-based resin molded article of the present invention includes a step of molding a molten polyolefin-based resin composition in a specific state, and the specific state means that crystals of the amide compound represented by the above general formula (1) are present in the polyolefin-based resin in a molten state.

The method for causing the crystals of the amide compound to be present in the polyolefin-based resin in a molten state is not particularly limited. However, examples thereof include a method in which the amide compound is heated and dissolved in the polyolefin-based resin and then cooled to precipitate crystals of the amide compound to obtain a polyolefin-based resin composition, and subsequently the polyolefin-based resin composition is heated to a temperature that is higher than the melting point of the polyolefin-based resin and lower than the dissolution temperature of the amide compound, and a method in which the amide compound and the polyolefin-based resin are dry-blended and the dry-blended product is heated to a temperature in a range that is higher than the melting point of the polyolefin-based resin and lower than the dissolution temperature of the amide compound. When the effect of modifying the polyolefin by the amide compound is taken into consideration, the former method is preferred.

More specifically, the following procedures are exemplified.

Procedure (A): The polyolefin-based resin (form such as powder, granule, flake or pellet), the amide compound according to the present invention, and a below-described polyolefin modifier according to need are added in a predetermined ratio and are subsequently powder-mixed with a usual mixer (e.g., a Henschel mixer, a ribbon blender, a V blender, a drum mixer or the like) normally at or near room temperature to obtain a dry-blended product, and then the dry-blended product is melt-kneaded with a usual kneading machine (e.g., a single-screw or multi-screw (twin-screw, quadruple-screw or the like) kneading extruder, a kneader, a kneading roll machine, a mixing roll machine, a pressure kneading machine, a Banbury mixer or the like) preferably at a temperature equal to or higher than the dissolution temperature of the amide compound (kneading temperature; normally 180 to 320° C., preferably 200 to 310° C., hereinafter, unless particularly specified, the melting temperature in the step in which the amide compound and the polyolefin-based resin are kneaded is referred to as "kneading temperature"). Next, the extruded strand is cooled by means of water cooling, air cooling or the like (normally, cooled to a temperature equal to or lower than the crystallization temperature of the polyolefin resin composition, and preferably to room temperature), and the obtained strand is cut to obtain a pellet type polyolefin-based resin composition. The polyolefin-based resin composition is heated to a temperature that is equal to or higher than the melting point of the polyolefin-based resin and lower than the dissolution temperature of the amide compound.

Procedure (B): The above dry-blended product is used as a polyolefin-based resin composition and heated to a temperature in the range that is equal to or higher than the melting point of the polyolefin-based resin and lower than the dissolution temperature of the amide compound.

Procedure (C): The similar procedure is performed by a master batch method instead of the full compound method of the above procedure (A) or (B).

The above procedure (A) or master batch method of the procedure (A) corresponds to a specific description of the procedure of the steps (i) to (iii) according to the present invention (the invention of the above-mentioned item 2 and the configuration according to the invention of the above-mentioned item 11).

In the method for molding the molten polyolefin-based resin composition in which the crystals of the amide compound according to the present invention are present in the polyolefin-based resin in a molten state, the range of the melting temperature for providing the molten state is specifically a temperature range that is equal to or higher than the melting point of the polyolefin-based resin and lower than the dissolution temperature of the amide compound, and the recommended range is preferably $T_1+10°$ C. to $T_2-10°$ C., more preferably $T_1+15°$ C. to $T_2-15°$ C., and particularly $T_1+20°$ C. to $T_2-15°$ C.

Here, $T_1$ represents the "melting point of the polyolefin-based resin", and $T_2$ represents, as the "dissolution temperature of the amide compound", the temperature at which the amide compound present in the polyolefin-based resin composition (a composition whose ingredients are the same as those of the intended polyolefin-based resin molded article) is completely dissolved. It should be noted that the relation of the temperature range satisfies $(T_1+10°$ C.$)<(T_2-10°$ C.$)$, $(T_1+15°$ C.$)<(T_2-15°$ C.$)$, or $(T_1+20°$ C.$)<(T_2-15°$ C.$)$.

Further, the melting point $T_1$ of the polyolefin-based resin represents a value measured by a method described in [Melting point] in below-described Examples, and the dissolution temperature $T_2$ of the amide compound represents a value measured by a method described in [Dissolution temperature and precipitation temperature] in below-described Examples.

In addition, although depending on the type of the polyolefin-based resin and the type and the blending amount of the amide compound, a more specific range of the melting temperature is preferably 180 to 260° C., more preferably 190 to 260° C., and even more preferably 200 to 255° C.

Examples of the method for molding the molten polyolefin-based resin composition according to the present invention include a method in which the pellet type polyolefin-based resin composition is molded by a known molding method (e.g., pressure forming, compression molding, vacuum forming, sheet forming, film forming, blow molding, extrusion thermoforming, extrusion molding, injection molding, spinning or the like) suitable for desired shape and form (film, sheet, bottle, case or the like), to produce a polyolefin molded article.

In the present invention, as described above, for the purpose of inhibiting the growth of crystals of the amide compound in the molten polyolefin-based resin, the phenol compound is caused to coexist or be blended. In other words, when crystals of the amide compound are present in the molten polyolefin-based resin and it is desired to inhibit the growth of the crystals, it is necessary to provide a state where the above-specified amount of the phenol compound coexists. Thus, the timing and procedure for blending the phenol compound is not particularly limited as long as the coexisting state is provided. In the above-mentioned procedures or at least one member selected from the steps (i) to (iii) according to the present invention, the phenol compound may be blended independently, may be blended together with the amide compound, another modifier or the like, may be blended in batch, or may be divided and blended.

In the present invention, for the purpose of modifying the polyolefin-based resin, a conventionally known polyolefin modifier may be added in such a range that the effect of the present invention is exerted.

Examples of the modifier for polyolefin include various additives mentioned in "Pojitibu Risuto No Tenkazai Youran (Additives Handbook of Positive List)" edited by Japan Hygienic Olefin and Styrene Plastics Association (January, 2002). More specific examples include stabilizers (metallic compounds, epoxy compounds, nitrogen compounds, phosphorus compounds, sulfur compounds and the like), ultraviolet absorbers (benzophenone-based compounds, benzotriazol-based compounds and the like), antioxidants (phosphite-based compounds, sulfur-based compounds), surfactants, lubricants (aliphatic hydrocarbons such as paraffin and wax, and higher fatty acids having 8 to 22 carbon atoms, metal (Al, Ca, Ma, Zn) salts of higher fatty acids having 8 to 22 carbon atoms, fatty acids having 8 to 18 carbon atoms, aliphatic alcohols having 8 to 22 carbon atoms, polyglycols, esters of higher fatty acids having 4 to 22 carbon atoms and aliphatic monohydric alcohols having 4 to 18 carbon atoms, higher fatty acid amides having 8 to 22 carbon atoms, silicone oils, and rosin derivatives), fillers (talc, hydrotalcite, mica, zeolite, perlite, diatomaceous earth, calcium carbonate, glass fiber and the like), neutralizers, antacids, foaming agents, foaming auxiliaries, polymer additives, fluorescent brighteners, plasticizers, molecular weight modifiers (radical generators), crosslinking agents, crosslinking accelerators, antistatic agents, anti-fogging agents, polymer alloy components (rubbers such as block SBR, random SBR, and hydrogenated products thereof, and polystyrenes), flame retardants, dispersants, organic and inorganic pigments, dyes, processing auxiliaries, anti-blocking agents, organic nucleating agents other than the above-mentioned amide compounds.

These modifiers can be used singly or in combination as appropriate.

<Method for Inhibiting Crystal Growth Rate of Amide Compound Present in Molten Polyolefin-Based Resin>

A method of the present invention is a method for inhibiting, in a polyolefin-based resin containing an amide compound, the crystal growth rate of the amide compound represented by the above general formula (1) that is present in the molten polyolefin-based resin. The above-mentioned phenol compound is incorporated in a weight ratio to the amide compound, amide compound:phenol compound, of 60:40 to 10:90. More preferably, it is recommended that the phenol compound is 0.07 to 1 parts by weight per 100 parts by weight of the polyolefin-based resin and/or the amide compound is 0.07 to 1 parts by weight per 100 parts by weight of the polyolefin-based resin. In this recommended mode, the effect of the present invention is more remarkably or more stably exerted.

Particularly, when the amide compound present in the molten polyolefin-based resin is an amide compound (microcrystals) which is dissolved in the polyolefin-based resin and cooled to be crystallized in the polyolefin-based resin, remarkableness of the effect of the present invention is recognized.

A description of the polyolefin resin, the amide compound, and the phenol compound according to the present invention is synonymous with the description in the above <Method for producing polyolefin-based resin molded article>.

<Crystal Growth Rate Inhibitor and Use as Crystal Growth Rate Inhibitor>

In a crystal growth rate inhibitor and use as a crystal growth rate inhibitor of the present invention, a description of the phenol compound is synonymous with the description in the above <Method for producing polyolefin-based resin molded article>.

EXAMPLES

Hereinafter, the present invention will be described in detail by means of examples. However, the present invention is not limited to these examples. An evaluation method for the examples and comparative examples are as follows.

[Method for Evaluating Effect of Inhibiting Crystal Growth Rate]

To a hot stage (manufactured by Mettler-Toledo International Inc., Hot Stage (FP82HT model)) set to the same temperature as the melting temperature, a polyolefin-based resin molded article and a Teflon (registered trademark) sheet (100 μm thick) as a spacer were sandwiched with a cover glass (manufactured by Matsunami Glass Ind., Ltd./18 mm×18 mm/No. 1 [0.12 to 0.17 mm]) and heated for one minute to melt the polyolefin-based resin molded article. Immediately after one minute elapsed, the glass top was pressed with tweezers to make adjustment such that the polyolefin-based resin molded article became a uniform thin film (100 μm). With an optical microscope (polarizing microscope ECLIPSE LV100POL, manufactured by Nikon Corporation (eyepiece: 10 times magnification, objective lens: 50 times magnification)), the maximum lengths of crystals of the amide compound present in the molten polyolefin-based resin were visually determined and evaluated.

Further, the maximum lengths of the crystals of the amide compound present in the molten polyolefin-based resin that was allowed to stand on the hot stage for two hours were visually determined and evaluated.

As an evaluation method, in the range of a field of view of the optical microscope that is a quadrangle of 170 μm long and 130 μm wide, the difference between: the number of crystals of the amide compound in the molten polyolefin-based resin that was allowed to stand for two hours on the hot stage set to the same temperature as the melting temperature, which crystals have maximum lengths equal to or larger than 10 μm; and the number of crystals having maximum lengths equal to or larger than 10 μm after the one minute was obtained, and was used to evaluate the effect of inhibiting the crystal growth rate.

[Melting Point]

Using a differential scanning calorimetric analysis apparatus (manufactured by PerkinElmer, Inc., diamond DSC), a melting point was measured according to JIS K 7121 (1987). About 10 mg of a polyolefin-based resin was set to the apparatus and held at 30° C. for three minutes, and then heated at a heating rate of 10° C./minute, and the highest point of the endothermic peak was regarded as the melting point (° C.).

[Dissolution Temperature and Precipitation Temperature]

A polyolefin-based resin composition whose ingredients are the same as those of the intended polyolefin-based resin molded article was previously prepared. For the polyolefin-based resin composition, a predetermined amount of each ingredient was dry-blended at room temperature, the dry-blended product was melt-kneaded with a twin-screw extruder, and the extruded strand was cooled with water and cut with a pelletizer to obtain a polyolefin-based resin composition in pellet form. The kneading temperature was set to a temperature at which the strand became visually transparent.

To a hot stage (same device as the above) set to 200° C., the pellet and a Teflon (registered trademark) sheet (same as the above) as a spacer were sandwiched with a cover glass (same as the above) and heated for one minute to melt the pellet, and then heated at a heating rate of 90° C./minute (to 320° C. as a standard) until the pellet was dissolved. With an optical microscope (same device as the above), the temperature (dissolution temperature (° C.)) at which the amide compound was dissolved in the polyolefin-based resin during this temperature increasing step was visually determined. Subsequently, in this dissolved state, cooling was performed to 200° C. at a cooling rate of −45° C./minute. The temperature (precipitation temperature (° C.)) at which the amide compound was precipitated during this cooling process was visually determined.

[Appearance]

The appearance of a polyolefin-based resin molded article was visually determined and evaluated on the basis of the following criteria.

◯; the appearance is good.
Δ; light yellow coloring can be slightly perceived.
X; abnormality such as coloring, fish eye, white spot, or crater is recognized in appearance.

[State of Screen Mesh of T-Die Extruder]

For Examples and Comparative Examples in which continuous extrusion molding was performed, the state of a screen mesh (wire gauze; 500 mesh) was visually determined and evaluated on the basis of the following criteria.

◯; clogging is hardly recognized.
Δ; clogging is slightly recognized.
X; clogging is clearly recognized.

Example 1

100 parts by weight of a polypropylene homopolymer (MFR=10 g/10 minutes, melting point; 168° C.) as a polyolefin-based resin, 0.3 parts by weight of N,N'-dicyclohexyl-2,6-naphthalenedicarboxamide (trade name; NJ Star NU-100, manufactured by New Japan Chemical Co., Ltd.) as an amide compound, 0.05 parts by weight of tetrakis[methylene-3-(3,5-di-tert-butyl-4-hydroxyphenyl)propionate]methane (manufactured by Ciba Specialty Chemicals Inc., trade name "IRGANOX1010") as a phenol compound, 0.13 parte by weight of tetrakis(2,4-di-tert-butylphenyl)phosphite (manufactured by Ciba Specialty Chemicals Inc., trade name "IRGAFOS168") as a polyolefin modifier, and 0.05 parte by weight of calcium stearate (manufactured by Nitto Kasei Kogyo KK, trade name "CP-S") were dry-blended at room temperature. The dry-blended product was melt-kneaded with a twin-screw extruder at a kneading temperature (resin temperature) of 300° C. to dissolve N,N'-dicyclohexyl-2,6-naphthalenedicarboxamide, and the extruded strand was cooled with water and cut with a pelletizer to obtain a polyolefin-based resin composition in pellet form. The strand was transparent, and no undissolved matter was recognized.

100 parts by weight of the obtained polyolefin-based resin composition and 0.3 parts by weight of tetrakis[methylene-3-(3,5-di-tert-butyl-4-hydroxyphenyl)propionate]methane were dry-blended at room temperature. The dry-blended polyolefin-based resin composition was melted and kneaded with a single-screw extruder at a melting temperature (resin temperature) of 230° C. and extruded into strand form, and the strand was cooled with water and then cut with a pelletizer to obtain a polyolefin-based resin molded article (pellet form) of the present invention.

The effect of inhibiting the crystal growth rate of the amide compound, the dissolution temperature, the precipitation temperature and the like were evaluated using the obtained polyolefin-based resin molded article. As a result, with regard to the inhibiting effect, the numbers of crystals equal to or larger than 10 μm were 0 after one minute, and three after two hours. It is evaluated that this result indicates a high effect of inhibiting the crystal growth rate. In addition, the dissolution temperature was 295° C., and the precipitation temperature was 239° C.

In addition, the fact that the evaluated crystals are crystals of N,N'-dicyclohexyl-2,6-naphthalenedicarboxamide was confirmed by that the hot stage temperature was set to 200° C., which is equal to or higher than the melting points of the other additives, the temperature increasing process was observed, and the crystals existed even when the temperature reached 200° C. Table 1 summarizes the composition, the production conditions, the evaluation results and the like.

Example 2

100 parts by weight of the above-mentioned polypropylene homopolymer and 9 parts by weight of tetrakis[methylene-3-(3,5-di-tert-butyl-4-hydroxyphenyl)propionate]methane were dry-blended at room temperature. The dry-blended product was extruded with a single-screw extruder at a resin temperature of 200° C., and the extruded strand was cooled with water and cut with a pelletizer to prepare a masterbatch of the phenol compound in pellet form.

3 parts by weight of the masterbatch and 100 parts by weight of the polyolefin-based resin composition obtained in Example 1 were dry-blended at room temperature. The dry-blended product was melted and kneaded with a single-screw extruder at a melting temperature (resin temperature) of 230° C. and extruded into strand form, and the strand was cooled with water and then cut with a pelletizer to obtain a polyolefin-based resin molded article (pellet form) of the present invention.

The effect of inhibiting the crystal growth rate of the amide compound, the dissolution temperature, the precipitation temperature and the like were evaluated using the obtained polyolefin-based resin molded article. As a result, the numbers of crystals equal to or larger than 10 μm were 0 after one minute, and four after two hours. It is evaluated that this result indicates a high effect of inhibiting the crystal growth rate. In addition, the dissolution temperature was 295° C., and the precipitation temperature was 240° C. Table 1 summarizes the composition, the production conditions, the evaluation results and the like.

Example 3

100 parts by weight of the above-mentioned polypropylene homopolymer and 0.3 parts by weight of the above-mentioned N,N'-dicyclohexyl-2,6-naphthalenedicarboxamide, 0.35 parts by weight of the above-mentioned tetrakis[methylene-3-(3,5-di-tert-butyl-4-hydroxyphenyl)propionate]methane, 0.13 weight of the above-mentioned tetrakis(2,4-di-tert-butylphenyl)phosphite, and 0.05 weight of the above-mentioned calcium stearate were dry-blended at room temperature. The dry-blended product was melt-kneaded with a twin-screw extruder at a kneading temperature (resin temperature) of 300° C. to dissolve N,N'-dicyclohexyl-2,6-naphthalenedicarboxamide, and the extruded strand was cooled with water and cut with a pelletizer to obtain a polyolefin-based resin composition in pellet form.

The obtained polyolefin-based resin composition was melted and kneaded with a single-screw extruder at a melting temperature (resin temperature) of 230° C. and extruded into strand form, and the strand was cooled with water and then cut with a pelletizer to obtain a polyolefin-based resin molded article (pellet form) of the present invention.

The effect of inhibiting the crystal growth rate of the amide compound, the dissolution temperature, the precipitation temperature and the like were evaluated using the obtained polyolefin-based resin molded article. As a result, the numbers of crystals equal to or larger than 10 μm were 0 after one minute, and four after two hours. It is evaluated that this result indicates a high effect of inhibiting the crystal growth rate. In addition, the dissolution temperature was 295° C., and the precipitation temperature was 240° C. Table 1 summarizes the composition, the production conditions, the evaluation results and the like.

Example 4

100 parts by weight of the polyolefin-based resin composition obtained in Example 1 and 0.3 parts by weight of octadecyl-3-(3,5-di-tert-butyl-4-hydroxyphenyl)propionate as a phenol compound were dry-blended at room temperature. The dry-blended product was melted and kneaded with a single-screw extruder at a melting temperature (resin temperature) of 230° C. and extruded into strand form, and the strand was cooled with water and then cut with a pelletizer to obtain a polyolefin-based resin molded article (pellet form) of the present invention.

The effect of inhibiting the crystal growth rate of the amide compound, the dissolution temperature, the precipitation temperature and the like were evaluated using the obtained polyolefin-based resin molded article. As a result, with regard to the inhibiting effect, the numbers of crystals equal to or larger than 10 μm were 0 after one minute, and four after two hours. It is evaluated that this result indicates a high effect of inhibiting the crystal growth rate. In addition, the dissolution temperature was 295° C., and the precipitation temperature was 238° C. Table 1 summarizes the composition, the production conditions, the evaluation results and the like.

Example 5

100 parts by weight of the polyolefin-based resin composition obtained in Example 1 and 0.3 parts by weight of 1,3,5-tris(3,5-di-tert-butyl-4-hydroxybenzyl)-1,3,5-triazine-2,4,6-(1H,3H,5H)-trione were dry-blended at room temperature. The dry-blended product was melted and kneaded with a single-screw extruder at a melting temperature (resin temperature) of 230° C. and extruded into strand form, and the strand was cooled with water and then cut with a pelletizer to obtain a polyolefin-based resin molded article (pellet form) of the present invention.

The effect of inhibiting the crystal growth rate of the amide compound, the dissolution temperature, the precipitation temperature and the like were evaluated using the obtained polyolefin-based resin molded article. As a result, with regard to the inhibiting effect, the numbers of crystals equal to or larger than 10 μm were 0 after one minute, and three after two hours. It is evaluated that this result indicates a high effect of inhibiting the crystal growth rate. In addition, the dissolution temperature was 295° C., and the precipitation temperature was 241° C. Table 1 summarizes the composition, the production conditions, the evaluation results and the like.

Example 6

A polyolefin-based resin molded article of the present invention was obtained by performing the same procedure as in Example 3 except that the type and the blending amount of the amide compound were changed to 0.2 parts by weight of 3,9-bis[4-(N-cyclohexylcarbamoyl)phenyl]-2,4,8,10-tetraoxaspiro[5.5]undecane, the blending amount of the phenol compound was changed to 0.2 parts by weight, the kneading temperature was changed to 80° C., and the melting temperature was changed to 200° C. Table 1 summarizes the composition, the production conditions, the evaluation results, and the like. It should be noted that the precipitation temperature was 210° C.

Example 7

A polyolefin-based resin molded article of the present invention was obtained by performing the same procedure as in Example 1 except that the type of the amide compound was changed to 3,9-bis[4-(N-cyclohexylcarbamoyl)phenyl]-2,4,8,10-tetraoxaspiro[5.5]undecane, the kneading temperature was changed to 290° C., and the melting temperature was changed to 210° C. Table 1 summarizes the composition, the production conditions, the evaluation results, and the like. It should be noted that the precipitation temperature was 240° C.

Examples 8 to 12

Polyolefin-based resin molded articles of the present invention were obtained by performing the same procedure as in Example 3 except that the blending amount of the amide compound, the kneading temperature, and the melting temperature were changed to numerical values described in Table 1. Table 1 summarizes the compositions, the production conditions, the evaluation results and the like. It should be noted that the precipitation temperatures were 230° C. in Example 8, 235° C. in Example 9, 250° C. in Example 10, 235° C. in Example 11, and 240° C. in Example 12.

Example 13

A polyolefin-based resin molded article of the present invention was obtained by performing the same procedure as in Example 3 except that the type of the phenol compound was changed to 1,3,5-tris(4-tert-butyl-3-hydroxy-2,6-dimethylbenzyl)-1,3,5-triazine-2,4,6-(1H,3H,5H)-trione. Table 1 summarizes the composition, the production conditions, the evaluation results and the like. It should be noted that the precipitation temperature was 240° C.

Example 14

A polyolefin-based resin molded article of the present invention was obtained by performing the same procedure as in Example 1 except that the type of the polyolefin-based resin was changed to an ethylenepropylene block copolymer (ethylene content; 9.5 wt %, MFR=26 g/10 minutes, melting point; 164° C.) Table 1 summarizes the composition, the production conditions, the evaluation results and the like. It should be noted that the precipitation temperature was 240° C.

Examples 15 and 16

Polyolefin-based resin molded articles of the present invention were obtained by performing the same procedure as in Example 3 except that the type of the amide compound was changed to amide compounds described in Table 1. Table 1 summarizes the compositions, the production conditions, the evaluation results and the like. It should be noted that the precipitation temperatures were 220° C. in Example 15 and 250° C. in Example 16.

Example 17

A polyolefin-based resin molded article of the present invention was obtained by performing the same procedure as in Example 3 except that the polyolefin modifier was not used. Table 1 summarizes the composition, the production conditions, the evaluation results and the like. It should be noted that the precipitation temperature was 240° C.

Example 18

A molded polyolefin-based resin article (sheet form) of the present invention was obtained by performing the same procedure as in Example 1 except that in the molding step, the single-screw extruder equipped with the screen mesh (wire gauze; 500 mesh) was replaced with a T-die extruder, an operation of performing extrusion into sheet form and cooling the sheet on a chill roll whose surface temperature was kept at 40° C. to obtain a polyolefin-based resin molded article in sheet form was performed instead, thereby performing continuous production. It should be noted that this production was performed continuously for 12 hours. Table 1 summarizes the composition, the production conditions, the evaluation results and the like. Clogging of the screen mesh was hardly recognized. The appearance was good. The precipitation temperature was 240° C.

Example 19

A polyolefin-based resin molded article (sheet form) of the present invention was obtained by performing the same procedure as in Example 20 except that in Example 20, the surface temperature of the chill roll was set to 120° C. and the cooling time (contacting time) at the chill roll was adjusted to 20 seconds. The β-form crystal content of the molded article was 72%. The appearance was good.

Comparative Example 1

The polyolefin-based resin composition described in Example 1 was melted and kneaded with a single-screw extruder at a melting temperature (resin temperature) of 230° C. and extruded into strand form, and the strand was cooled with water and then cut with a pelletizer to obtain a polyolefin-based resin molded article (pellet form) that is out of the present invention.

The effect of inhibiting the crystal growth rate of the amide compound, the dissolution temperature, the precipitation temperature, and the like were evaluated using the obtained polyolefin-based resin molded article. As a result, with regard to the inhibiting effect, the numbers of crystals equal to or larger than 10 μm were 0 after one minute, and 25 after two hours. It is evaluated that this result indicates a low effect of inhibiting the crystal growth rate. In addition, the dissolution temperature was 288° C., and the precipitation temperature was 220° C. Table 1 summarizes the composition, the production conditions, the evaluation results and the like.

Comparative Example 2

A polyolefin-based resin molded article that is out of the present invention was obtained by performing the same procedure as in Example 3 except that the blending amount of the phenol compound was changed to 3 parts by weight. Table 1 summarizes the composition, the production conditions, the evaluation results and the like. It should be noted that the precipitation temperature was 250° C.

Comparative Example 3

A polyolefin-based resin molded article that is out of the present invention was obtained by performing the same procedure as in Example 3 except that the type of the amide compound was changed to 3,9-bis[4-(N-cyclohexylcarbamoyl)phenyl]-2,4,8,10-tetraoxaspiro[5.5]undecane, the blending amount of the phenol compound was changed to 0.05 parts by weight, the kneading temperature was changed to 280° C., and the melting temperature was changed to 210° C. Table 1 summarizes the composition, the production conditions, the evaluation results and the like. It should be noted that the precipitation temperature was 230° C.

Comparative Example 4

A polyolefin-based resin molded article that is out of the present invention was obtained by performing the same procedure as in Example 18 except that in Example 18, split addition of the phenol compound was not performed and its blending amount was changed to 0.05 parts by weight. This production was performed continuously for 12 hours. Table 1 summarizes the composition, the production conditions, the evaluation results and the like. Clogging of the screen mesh was clearly recognized, and the pressure of the screw increased. Thus, while the screen mesh was replaced, the 12-hour operation was performed. Table 1 summarizes the composition, the production conditions, the evaluation results and the like. It should be noted that the precipitation temperature was 220° C.

TABLE 1

| | Composition of polyolefin-based resin molded article | | | | | | | | Evaluation results | |
|---|---|---|---|---|---|---|---|---|---|---|
| | Polyolefin-based resin | | Amide compound | | Phenol compound | | | Production conditions | | Growth inhibiting effect | |
| | (parts by weight) | Type | (parts by weight) | Type | (parts by weight) | Type | Blending method | Kneading temp. (° C.) | Melting temp. (° C.) | Dissolution temp. (° C.) | Number after two hours | Appearance |
| Ex. 1 | 100 | h-PP | 0.3 | A | 0.352 | a | Split addition | 300 | 230 | 295 | 3 | ○ |
| Ex. 2 | 100 | h-PP | 0.292 | A | 0.291 | a | Masterbatch | 300 | 230 | 295 | 4 | ○ |
| Ex. 3 | 100 | h-PP | 0.3 | A | 0.35 | a | Batch addition | 300 | 230 | 295 | 4 | ○ |
| Ex. 4 | 100 | h-PP | 0.3 | A | 0.352 | a, b | Split addition | 300 | 230 | 295 | 4 | ○ |
| Ex. 5 | 100 | h-PP | 0.3 | A | 0.352 | a, c | Split addition | 300 | 230 | 295 | 3 | ○ |
| Ex. 6 | 100 | h-PP | 0.2 | B | 0.2 | a | Batch addition | 280 | 200 | 275 | 4 | ○ |
| Ex. 7 | 100 | h-PP | 0.3 | B | 0.352 | a | Split addition | 290 | 210 | 280 | 5 | ○ |
| Ex. 8 | 100 | h-PP | 0.1 | A | 0.08 | a | Batch addition | 280 | 230 | 270 | 6 | ○ |
| Ex. 9 | 100 | h-PP | 0.2 | A | 0.15 | a | Batch addition | 290 | 230 | 280 | 5 | ○ |
| Ex. 10 | 100 | h-PP | 0.5 | A | 0.35 | a | Batch addition | 310 | 240 | 300 | 7 | ○ |
| Ex. 11 | 100 | h-PP | 0.1 | A | 0.4 | a | Batch addition | 290 | 230 | 280 | 3 | ○ |
| Ex. 12 | 100 | h-PP | 0.2 | A | 0.8 | a | Batch addition | 300 | 230 | 290 | 3 | ○ |
| Ex. 13 | 100 | h-PP | 0.3 | A | 0.35 | d | Batch addition | 300 | 230 | 295 | 3 | ○ |
| Ex. 14 | 100 | b-PP | 0.3 | A | 0.352 | a | Split addition | 300 | 230 | 295 | 3 | ○ |
| Ex. 15 | 100 | h-PP | 0.5 | C | 0.35 | a | Batch addition | 270 | 225 | 260 | 10 | ○ |
| Ex. 16 | 100 | h-PP | 0.5 | D | 0.35 | a | Batch addition | 310 | 240 | 300 | 11 | ○ |
| Ex. 17 | 100 | h-PP | 0.3 | A | 0.3 | a | Batch addition | 300 | 230 | 295 | 4 | ○ |
| Ex. 18 | 100 | h-PP | 0.3 | A | 0.352 | a | Split addition | 300 | 230 | 295 | 4 | ○ |
| Com. Ex. 1 | 100 | h-PP | 0.3 | A | 0.05 | a | Batch addition | 300 | 230 | 290 | 25 | ○ |
| Com. Ex. 2 | 100 | h-PP | 0.3 | A | 3.0 | a | Batch addition | 300 | 230 | 295 | 4 | x |
| Com. Ex. 3 | 100 | h-PP | 0.3 | B | 0.05 | a | Batch addition | 280 | 210 | 275 | 30 | ○ |
| Com. Ex. 4 | 100 | h-PP | 0.3 | A | 0.05 | a | Batch addition | 300 | 230 | 290 | 27 | ○ |

It should be noted that the abbreviations shown in Table 1 are as follows.

h-PP: Polypropylene homopolymer b-PP: Ethylenepropylene block copolymer

A: N,N'-dicyclohexyl-2,6-naphthalenedicarboxamide

B: 3,9-bis[4-(N-cyclohexylcarbamoyl)phenyl]-2,4,8,10-tetraoxaspiro[5.5]undecane

C: 1,2,3-propanetricarboxylic acid tri(2-methylcyclohexylamide)

D: Trimesic acid tricyclohexylamide a: Tetrakis[methylene-3-(3,5-di-tert-butyl-4-hydroxyphenyl)propionate]methane b: Octadecyl-3-(3,5-di-tert-butyl-4-hydroxyphenyl) propionate c: 1,3,5-tris(3,5-di-tert-butyl-4-hydroxybenzyl)-1,3,5-triazine-2,4,6-(1H,3H,5H)-trione d: 1,3,5-tris(4-tert-butyl-3-hydroxy-2,6-dimethylbenzyl)-1,3,5-triazine-2,4,6-(1H,3H,5H)-trione

INDUSTRIAL APPLICABILITY

By the method for inhibiting the crystal growth rate of the amide compound present in the molten polyolefin-based resin of the present invention, the crystal growth rate of the amide compound present in the molten polyolefin-based resin in the molding step can be inhibited. The method is effective particularly when a step in which a retention time of the polyolefin-based resin composition is long is included in the molding step. The method can contribute to reduction of white spots that are based on the amide compound in the obtained polyolefin resin molded article.

Figure 1:
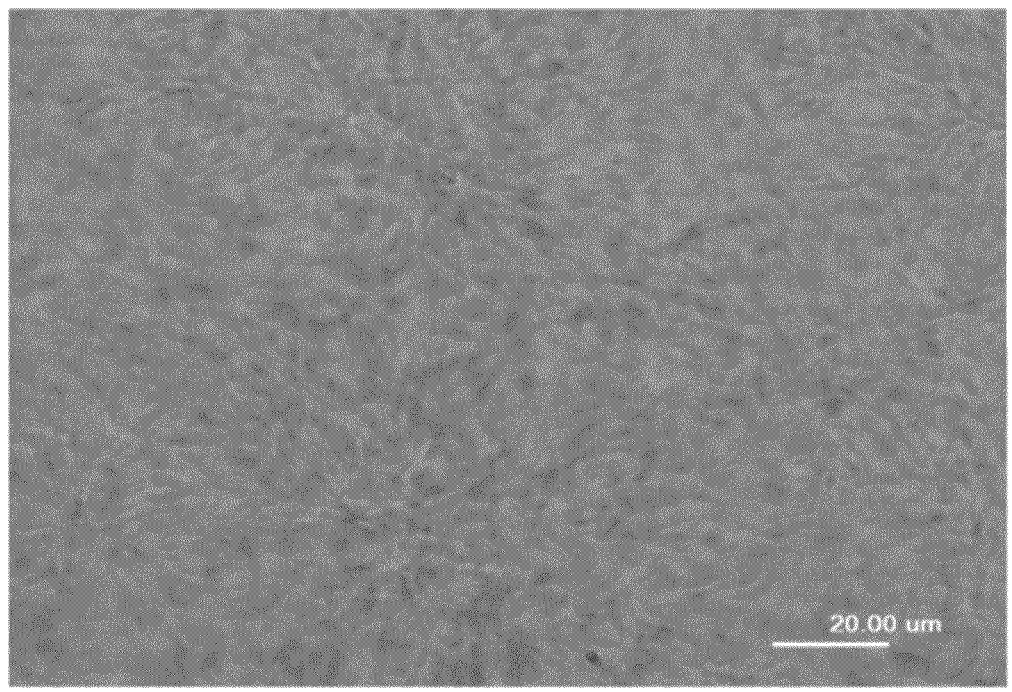
FIG. 1 is a photomicrograph of a polyolefin-based resin composition (Example 1).
Figure 2:
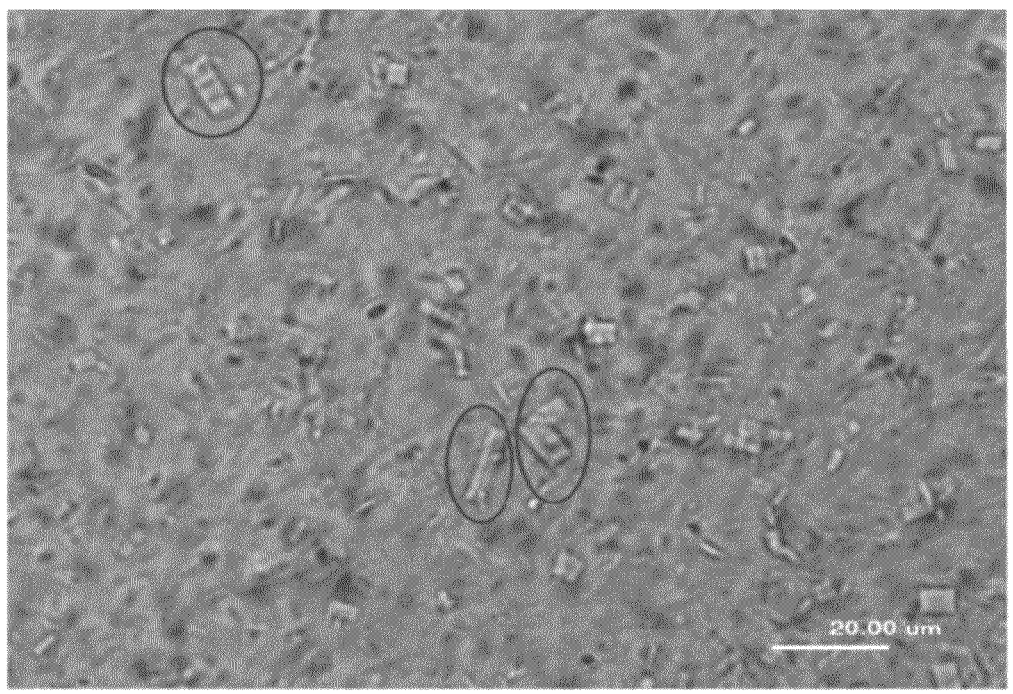
FIG. 2 is a photomicrograph of a polyolefin-based resin molded article (Example 1) when an effect of inhibiting a crystal growth rate was evaluated (heated and allowed to stand for two hours), showing crystals of 10 μm or larger in circles or ellipses.
Figure 3:
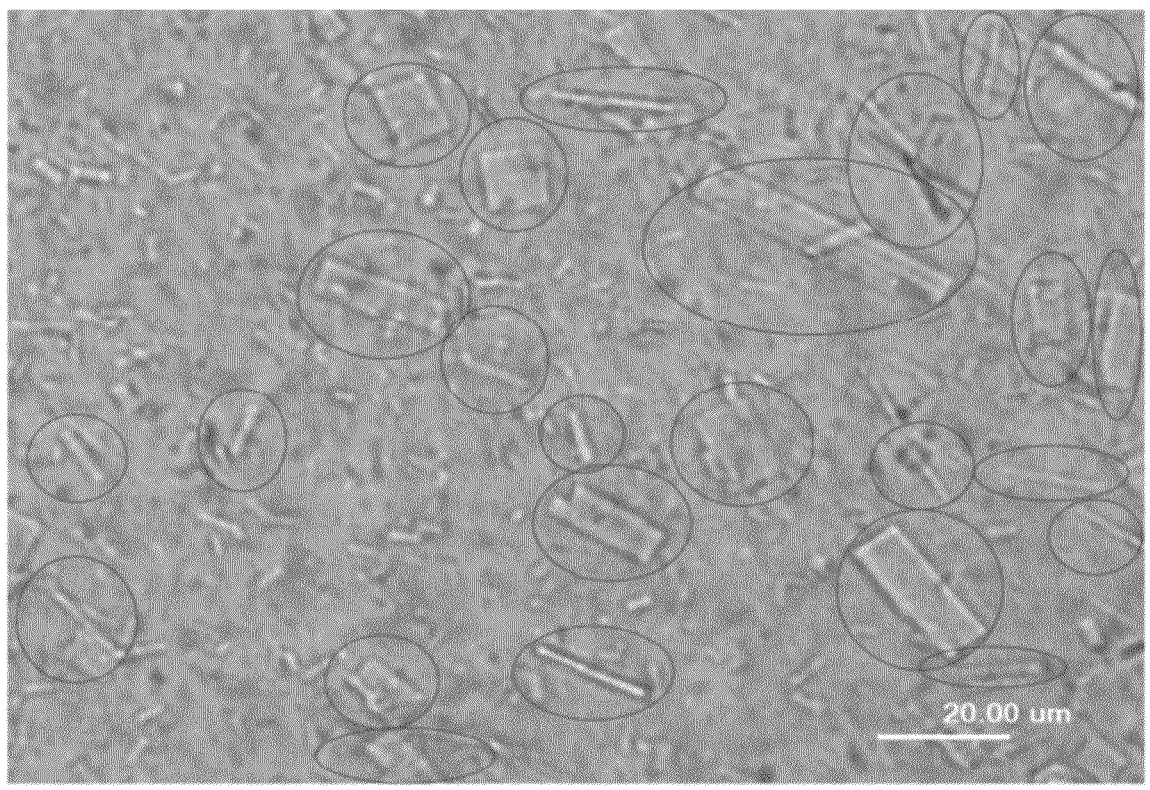
FIG. 3 is a photomicrograph of a polyolefin-based resin molded article (Comparative Example 1) when an effect of inhibiting a crystal growth rate was evaluated (heated and allowed to stand for two hours), showing crystals of 10 μm or larger in circles or ellipses.

The invention claimed is:

1. A method for producing a polyolefin-based resin molded article, comprising a step of molding a molten polyolefin-based resin composition in which crystals of an amide compound represented by the following general formula (1) are present in a polyolefin-based resin in a molten state, wherein the molten polyolefin-based resin composition contains a phenol compound, and a blending ratio of the amide compound and the phenol compound is 60:40 to 10:90 (weight ratio), general formula (1):

$$R^1-(CONHR^2)_n \qquad (1),$$

wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms, wherein the phenol compound is n-octadecyl-β-(4'-hydroxy-3',5'-di-tert-butylphenyl)propionate, 2,4-bis(octylthiomethyl)-6-methylphenol, a compound represented by general formula (2b):

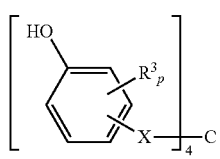

(2b)

wherein p represents an integer of 1 to 4, p R³s are the same or different and each represent a linear or branched alkyl group having 1 to 25 carbon atoms that may have an ester bond, a thioether bond, or an ether bond, and X represents a linear or branched alkylene group having 1 to 10 carbon atoms that may have an ester bond or an ether bond, or a compound represented by general formula (2c):

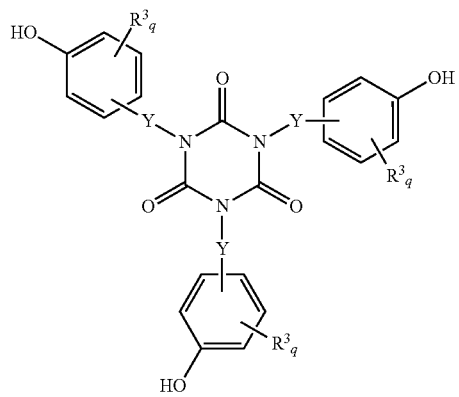

(2c)

wherein q represents an integer of 1 to 4, q R³s are the same or different and each represent a linear or branched alkyl group having 1 to 25 carbon atoms that may have an ester bond, a thioether bond, or an ether bond, and Y represents a linear or branched alkylene group having 1 to 10 carbon atoms, and wherein a blending amount of the phenol compound is 0.07 to 1 parts by weight per 100 parts by weight of the polyolefin-based resin.

2. The method for producing a polyolefin-based resin molded article according to claim 1, comprising the steps of:

(i) heating and dissolving the amide compound in the polyolefin-based resin;

(ii) cooling the polyolefin-based resin composition in a molten state obtained in the step (i), to precipitate crystals of the amide compound; and (iii) melting the polyolefin-based resin composition in which the crystals of the amide compound are precipitated, obtained in the step (ii), in a temperature range of $T_1+10°$ C. to $T_2-10°$ C. ($T_1$ represents a melting point of the polyolefin-based resin and $T_2$ represents a dissolution temperature of the amide compound), and molding the molten polyolefin-based resin composition, wherein in at least one member selected from the steps (i) to (iii), the phenol compound is blended in the range of the blending ratio.

3. The method for producing a polyolefin-based resin molded article according to claim 1, wherein $R^1$ described in general formula (1) is formula (a):

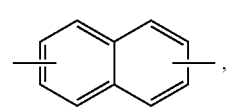

(a)

or formula (b):

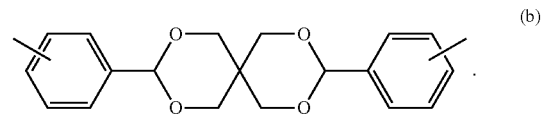

(b)

4. The method for producing a polyolefin-based resin molded article according to claim 1, wherein the melting temperature of the molten polyolefin-based resin composition described in claim 1 is 180 to 260° C.

5. The method for producing a polyolefin-based resin molded article according to claim 1, wherein a blending amount of the amide compound is 0.07 to 1 parts by weight per 100 parts by weight of the polyolefin-based resin.

6. The method for producing a polyolefin-based resin molded article according to claim 1, wherein the polyolefin-based resin is a polypropylene-based resin, the amide compound is a β-form crystallization nucleating agent for polypropylene, and the polyolefin-based resin molded article is a polypropylene-based resin molded article having a β-form crystal content of 50% or higher.

7. A method for inhibiting a crystal growth rate of an amide compound represented by the following general formula (1) that is present in a molten polyolefin-based resin, the method comprising incorporating a phenol compound into a polyolefin-based resin such that a ratio of the amide compound and the phenol compound is 60:40 to 10:90 (weight ratio), general formula (1):

$$R^1\text{—}(CONHR^2)_n \qquad (1),$$

wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms, wherein the phenol compound is n-octadecyl-β-(4'-hydroxy-3',5'-di-tert-butylphenyl)propionate, 2,4-bis(octylthiomethyl)-6-methylphenol, a compound represented by general formula (2b):

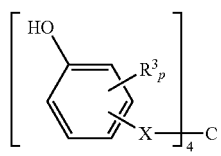
(2b)

wherein p represents an integer of 1 to 4, p $R^3$s are the same or different and each represents a linear or branched alkyl group having 1 to 25 carbon atoms that may have an ester bond, a thioether bond, or an ether bond, and X represents a linear or branched alkylene group having 1 to 10 carbon atoms that may have an ester bond or an ether bond, or a compound represented by general formula (2c):

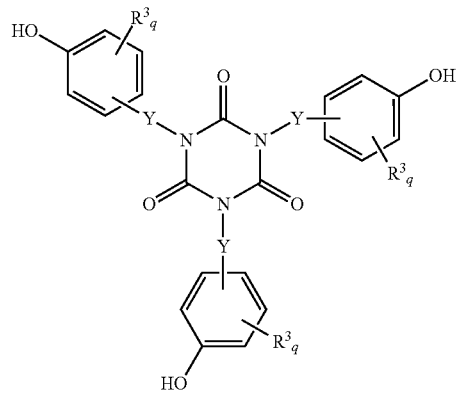
(2c)

wherein q represents an integer of 1 to 4, q $R^3$s are the same or different and each represents a linear or branched alkyl group having 1 to 25 carbon atoms that may have an ester bond, a thioether bond, or an ether bond, and Y represents a linear or branched alkylene group having 1 to 10 carbon atoms, and wherein a blending amount of the phenol compound is 0.07 to 1 parts by weight per 100 parts by weight of the polyolefin-based resin.

8. The method according to claim 7, wherein a melting temperature of the molten polyolefin-based resin composition is in a temperature range of $T_1+10°$ C. to $T_2-10°$ C. ($T_1$ represents a melting point of the polyolefin-based resin and $T_2$ represents a dissolution temperature of the amide compound).

9. The method according to claim 7, wherein the phenol compound is blended in at least one member selected from the following steps (i) to (iii):
  (i) heating and dissolving the amide compound in the polyolefin-based resin;
  (ii) cooling the polyolefin-based resin composition in a molten state, obtained in the step (i), to precipitate crystals of the amide compound; and
  (iii) melting the polyolefin-based resin composition in which the crystals of the amide compound are precipitated, obtained in the step (ii), in a temperature range of $T_1+10°$ C. to $T_2'$ $10°$ C. ($T_1$ represents a melting point of the polyolefin-based resin and $T_2$ represents a dissolution temperature of the amide compound), and molding the molten polyolefin-based resin composition, and
    inhibiting the crystal growth rate of the amide compound present in the molten polyolefin-based resin in the step (iii), and with regard to the blending ratio of the phenol compound, amide compound: phenol compound is 60:40 to 10:90 (weight ratio).

10. The method according to claim 7, wherein $R^1$ described in general formula (1) is formula (a):

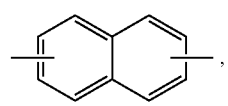
(a)

or formula (b):

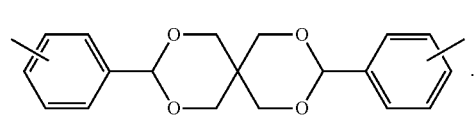
(b)

11. The method according to claim 7, wherein the phenol compound is general formula (2a):

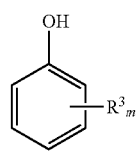
(2a)

wherein m represents an integer of 2 to 5, and m $R^3$s are the same or different and each represent a linear or branched alkyl group having 1 to 25 carbon atoms that may have an ester bond, a thioether bond, or an ether bond, general formula (2b):

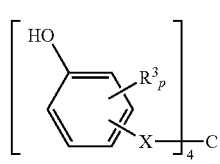
(2b)

wherein p represents an integer of 1 to 4, p $R^3$s are the same as those in the formula (2a), and X represents a linear or branched alkylene group having 1 to 10 carbon atoms that may have an ester bond or an ether bond, or general formula (2c):

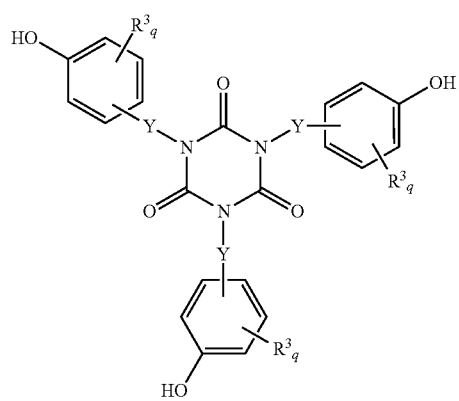
(2c)

wherein q represents an integer of 1 to 4, q $R^3$s are the same as those in the formula (2a), and Y represents a linear or branched alkylene group having 1 to 10 carbon atoms.

12. The method according to claim 7, wherein the melting temperature of the molten polyolefin-based resin described in claim 7 or a melting temperature in the step (iii) described in claim 9 is 180 to 260° C.

13. The method according to claim 7, wherein a blending amount of the phenol compound is 0.07 to 1 parts by weight per 100 parts by weight of the polyolefin-based resin.

14. The method according to claim 7, wherein a blending amount of the amide compound is 0.07 to 1 parts by weight per 100 parts by weight of the polyolefin-based resin.

15. The method for producing a polyolefin-based resin molded article according to claim 2, wherein the melting temperature in the step (iii) described in claim 2 is 180 to 260° C.

16. A method for producing a polyolefin-based resin molded article, comprising a step of molding a molten polyolefin-based resin composition in which crystals of an amide compound represented by the following general formula (1) are present in a polyolefin-based resin in a molten state, wherein the molten polyolefin-based resin composition contains a phenol compound, and a blending ratio of the amide compound and the phenol compound is 50:50 to 10:90 (weight ratio), general formula (1):

$$R^1—(CONHR^2)_n \quad (1),$$

wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms, wherein the phenol compound is n-octadecyl-β-(4'-hydroxy-3',5'-di-tert-butylphenyl)propionate, 2,4-bis(octylthiomethyl)-6-methylphenol, a compound represented by general formula (2b):

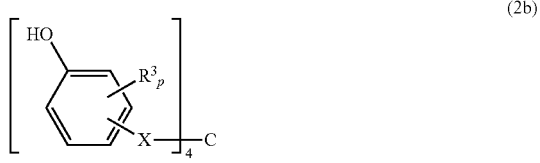

(2b)

wherein p represents an integer of 1 to 4, p $R^3$s are the same or different and each represent a linear or branched alkyl group having 1 to 25 carbon atoms that may have an ester bond, a thioether bond, or an ether bond, and X represents a linear or branched alkylene group having 1 to 10 carbon atoms that may have an ester bond or an ether bond, or a compound represented by general formula (2c):

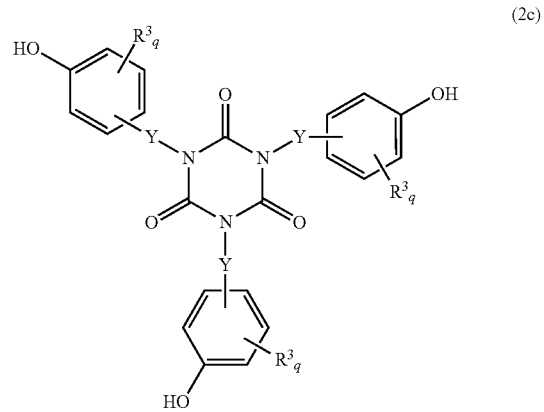

(2c)

wherein q represents an integer of 1 to 4, q $R^3$s are the same or different and each represent a linear or branched alkyl group having 1 to 25 carbon atoms that may have an ester bond, a thioether bond, or an ether bond, and Y represents a linear or branched alkylene group having 1 to 10 carbon atoms, and wherein a blending amount of the phenol compound is 0.07 to 1 parts by weight per 100 parts by weight of the polyolefin-based resin.

17. A method for producing a polyolefin-based resin molded article, comprising a step of molding a molten polyolefin-based resin composition in which crystals of an amide compound represented by the following general formula (1) are present in a polyolefin-based resin in a molten state, wherein the molten polyolefin-based resin composition contains a phenol compound, and a blending ratio of the amide compound and the phenol compound is 50:50 to 10:90 (weight ratio), general formula (1):

$$R^1—(CONHR^2)_n \quad (1),$$

wherein n represents an integer of 2 to 4, $R^1$ represents a saturated or unsaturated aliphatic polycarboxylic acid residue having 3 to 6 carbon atoms, an alicyclic polycarboxylic acid residue having 3 to 25 carbon atoms, or an aromatic polycarboxylic acid residue having 6 to 25 carbon atoms, and two to four $R^2$s are the same or different and each represent a saturated or unsaturated aliphatic amine residue having 5 to 22 carbon atoms, an alicyclic amine residue having 5 to 20 carbon atoms, or an aromatic amine residue having 6 to 20 carbon atoms, wherein the phenol compound is n-octadecyl-β-(4'-hydroxy-3',5'-di-tert-butylphenyl)propionate, 2,4-bis(octylthiomethyl)-6-methylphenol, a compound represented by general formula (2b):

(2b)

wherein p represents an integer of 1 to 4, p $R^3$s are the same or different and each represent a linear or branched alkyl group having 1 to 25 carbon atoms that may have an ester bond, a thioether bond, or an ether bond, and X represents a linear or branched alkylene group having 1 to 10 carbon atoms that may have an ester bond or an ether bond, or a compound represented by general formula (2c):

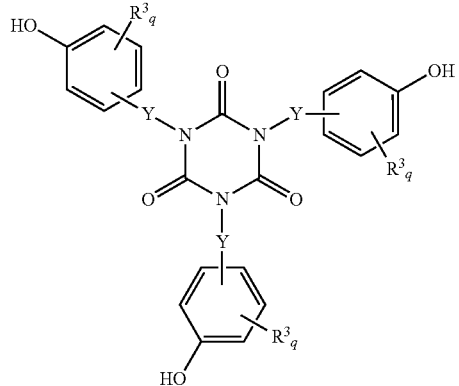

(2c)

wherein q represents an integer of 1 to 4, q $R^3$s are the same or different and each represent a linear or branched alkyl group having 1 to 25 carbon atoms that may have an ester bond, a thioether bond, or an ether bond, and Y represents a linear or branched alkylene group having 1 to 10 carbon atoms, wherein a blending amount of the phenol compound is 0.07 to 1 parts by weight per 100 parts by weight of the polyolefin-based resin, and wherein a blending amount of the amide compound is 0.07 to 1 parts by weight per 100 parts by weight of the polyolefin-based resin.

\* \* \* \* \*